No. 754,263. PATENTED MAR. 8, 1904.
S. T. & C. H. WELLMAN, J. W. SEAVER & T. R. MORGAN.
MACHINE FOR CHARGING COKE OVENS.
APPLICATION FILED APR. 21, 1902.
NO MODEL. 3 SHEETS—SHEET 1.
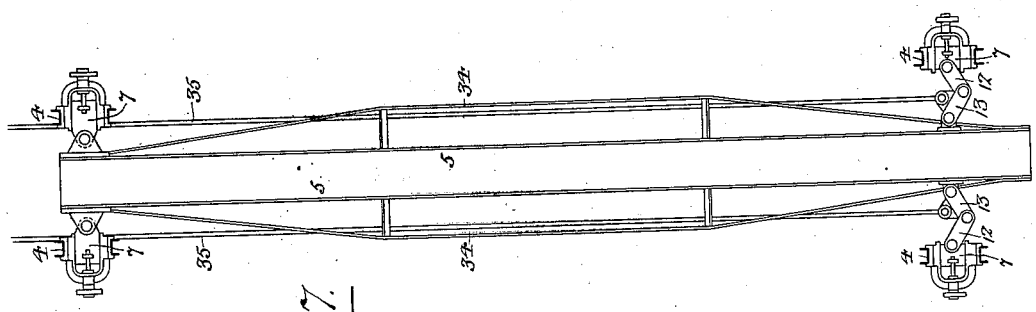
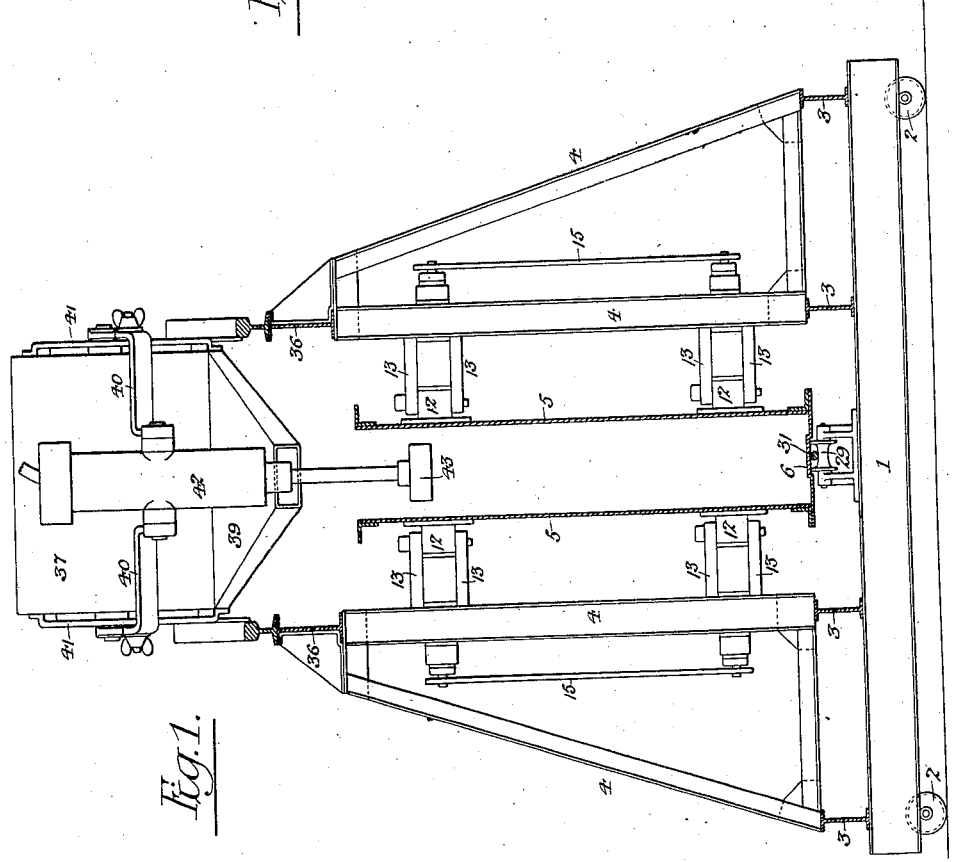

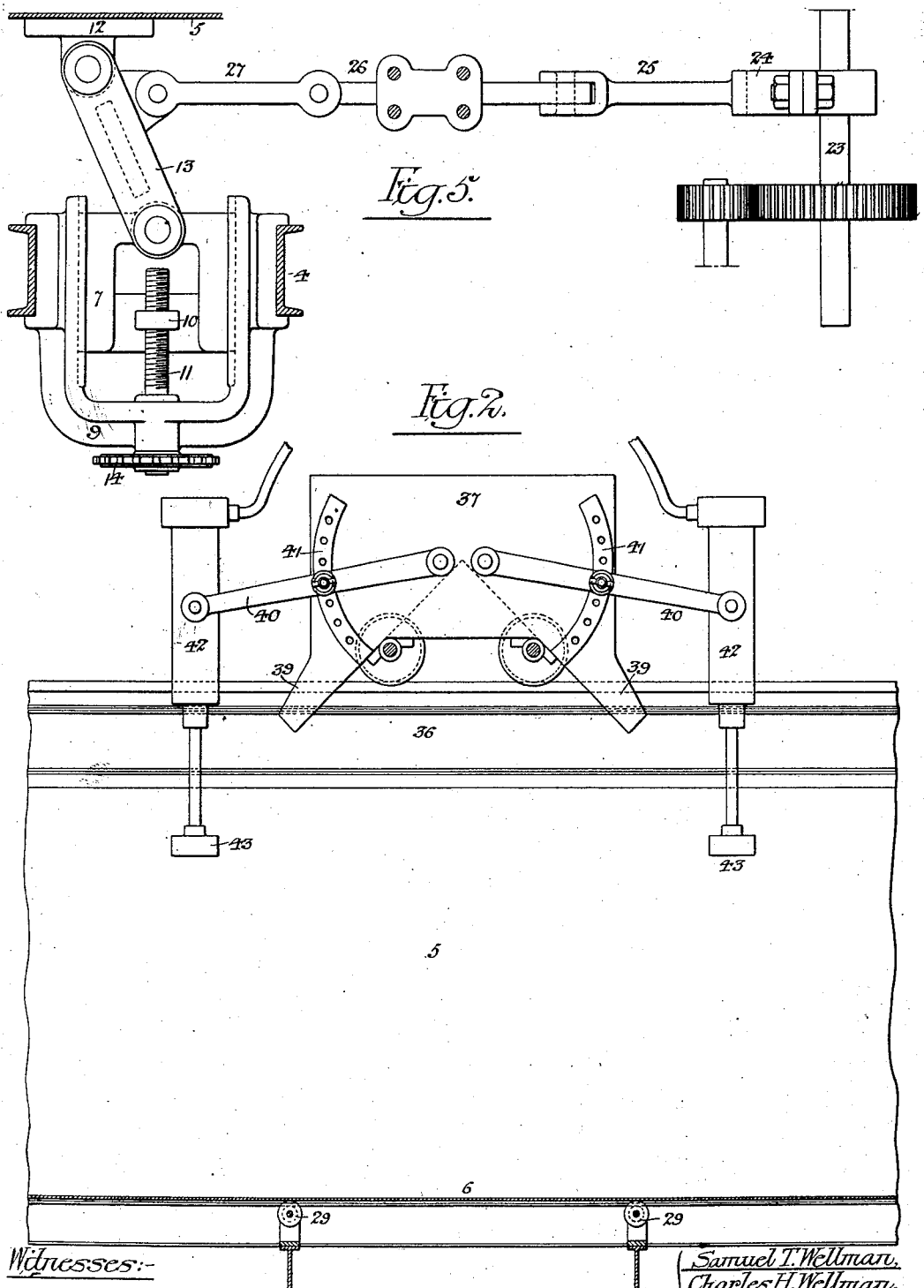

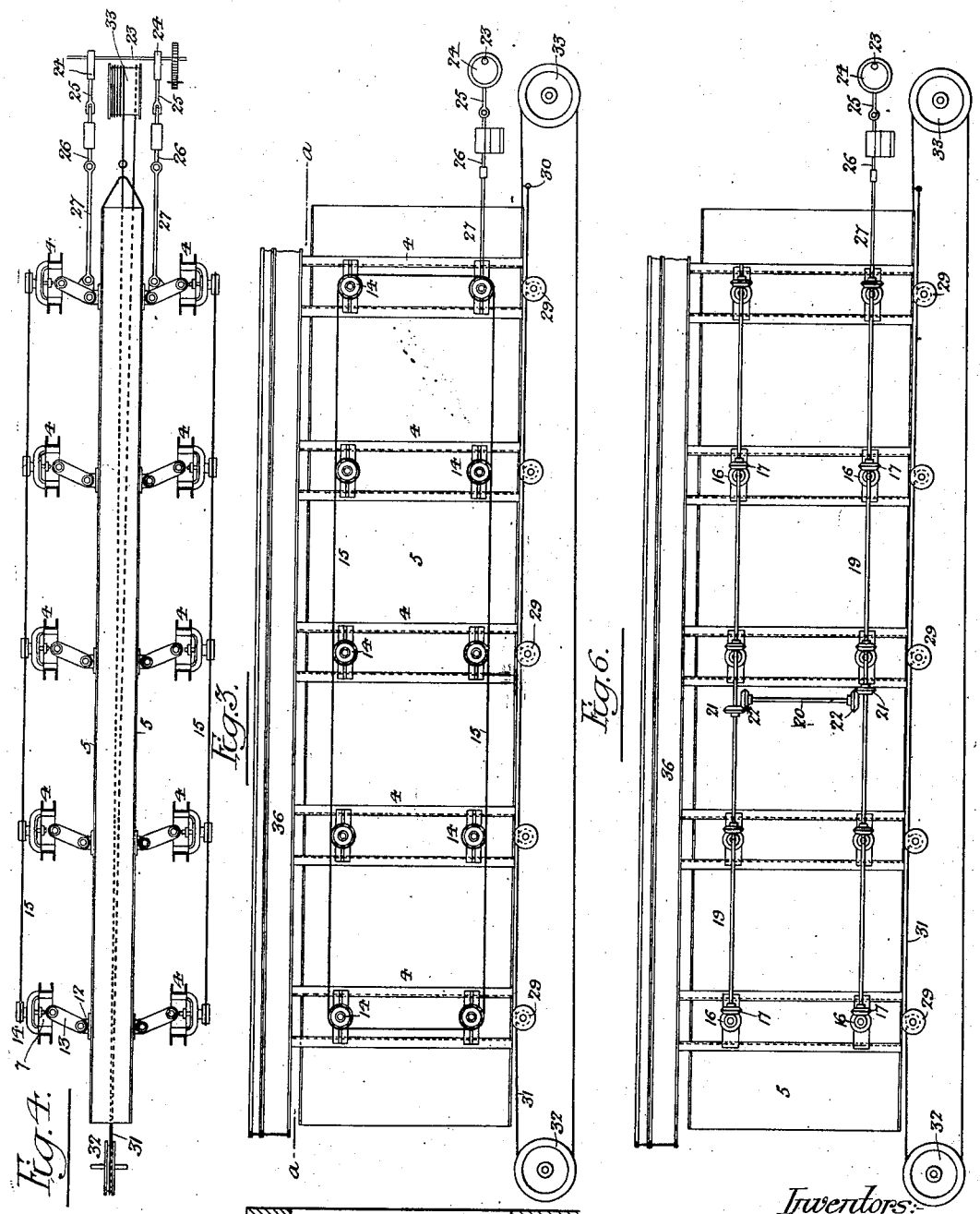

No. 754,263. Patented March 8, 1904.

UNITED STATES PATENT OFFICE.

SAMUEL T. WELLMAN, CHARLES H. WELLMAN, JOHN W. SEAVER, AND THOMAS R. MORGAN, OF CLEVELAND, OHIO, ASSIGNORS TO THE WELLMAN-SEAVER-MORGAN COMPANY, OF CLEVELAND, OHIO, A CORPORATION OF OHIO.

MACHINE FOR CHARGING COKE-OVENS.

SPECIFICATION forming part of Letters Patent No. 754,263, dated March 8, 1904.

Application filed April 21, 1902. Serial No. 104,003. (No model.)

*To all whom it may concern:*

Be it known that we, SAMUEL T. WELLMAN, CHARLES H. WELLMAN, JOHN W. SEAVER, and THOMAS R. MORGAN, all citizens of the United States, and residents of Cleveland, Ohio, have invented certain Improvements in Machines for Charging Coke-Ovens, of which the following is a specification.

One object of our invention is to so construct a machine for charging coke-ovens that the coal can be readily fed into and compacted within the hopper constituting part of the machine and which receives and gives proper form to the charge preparatory to the introduction of the same into the oven, the invention also comprising means whereby the charge after being formed in the hopper is released from lateral pressure, so that it can be carried forward into the oven with the exercise of a minimum amount of power. These objects we attain in the manner hereinafter set forth, reference being had to the accompanying drawings, in which—

Figure 1 is a transverse section of a coke-oven-charging machine constructed in accordance with our invention. Fig. 2 is a longitudinal section of part of the same. Fig. 3 is a side view of the coal-receiving hopper and parts operating in conjunction therewith. Fig. 4 is a sectional plan view on the line *a a*, Fig. 3. Fig. 5 is an enlarged view of part of the mechanism shown in Fig. 4. Fig. 6 is a view similar to Fig. 3, but illustrating a modification of the invention; and Fig. 7 is a similar view to Fig. 4, but illustrating another modification of the invention.

Our improved coke-oven-charging device comprises a box or hopper open at the top and of the desired shape and dimensions for the mass of coal which is to constitute the charge for the oven, this hopper being mounted upon a framework which can be moved along in front of a row of ovens so as to bring the hopper into line successively with the ovens of the row. The sides of the hopper are movable from and toward each other and the bottom of the hopper is disconnected from the sides and is movable longitudinally, so that it can be projected into the oven in order to carry into the same the charge of coal deposited upon it. The supporting-frame for the hopper has top rails for a charging-truck, which can thus deliver its charge into any desired portion of the hopper, and this charging-truck carries fluid-actuated hammers for compressing or compacting within the hopper the coal delivered into the same from the truck. The hopper shown in the drawings is a long deep narrow box mounted upon a supporting-framework comprising transverse base-beams 1, any desired number of which may be provided with wheels 2 for running upon suitable rails in front of the row of ovens, these transverse base-beams supporting longitudinal base-beams 3, upon which are mounted opposite rows of vertical girders 4, suitably trussed in order to give the necessary rigidity, the girders being preferably of triangular form, as shown in Fig. 1, so as to present wide bases for their support upon the beams 3, whereby they are best calculated to resist the lateral spreading apart of the upper ends of the girders. The sides 5 of the hopper and the bottom 6 of the same are disconnected from each other, and each side of the hopper is connected at suitable intervals throughout its length to upper and lower sliding blocks 7, guided horizontally in frames or yokes 9, secured to the vertical girders 4, each slide having a nut 10, which is adapted to a threaded portion of a stem 11, mounted so as to be free to turn in a bearing in the outer portion of the yoke 9. Hence by turning said stem the slides 7 of opposite girders 4 can be caused to move from and toward each other. The connection between each slide 7 and the side of the hopper consists of a toggle having one member, 12, secured to the side of the hopper, the other member, 13, being pivoted to the member 12 and also to the slide 7, as shown in Fig. 5. Two means are thus provided for effecting movement of the sides of the hopper toward and from each other, so as to contract and expand said hopper laterally, one means being the simultaneous movement of the slides 7 of each row of girders 4 from and toward the corresponding slides of the opposite row of girders and the other means being the simultaneous straightening or bending of the toggle connections between the slides 7 and the sides of the hopper. Simultaneous movement of all of the slides carrying a side of the hopper can be effected by simultaneously turning all of the screw-stems 11, whereby the movement of said slides is effected, and this can be accomplished in different ways. For instance, as shown in Figs. 1, 3, 4, and 5, the screw-stems are provided at their outer ends with sprocket-wheels 14, the entire series of sprocket-wheels at each side of the machine being in engagement with an endless chain 15, whereby when movement is imparted to this chain each of the sprocket-wheels of the entire set may be caused to move to the same extent in one direction or the other, thereby advancing or retracting the entire series of slides 7 on that side of the machine. In Fig. 6 we have illustrated another method of accomplishing the result, each of the screw-stems 11 in this case being provided with a bevel-wheel 16, which meshes with a similar bevel-wheel 17 on a longitudinal shaft 19, there being two of these shafts, one for the upper row of screw-stems and the other for the lower row of the same, and said upper and lower longitudinal shafts being connected by a vertical shaft 20 and bevel-wheels 21 and 22, whereby turning of either shaft 19 or of the shaft 20 will effect simultaneous operation of all of the screw-stems controlling the slides on that side of the machine.

Bending or straightening of the toggles connecting the slides 7 and the sides of the hopper can be effected by suitable power mechanism at the end of the machine, and in Figs. 3, 4, and 5 we have shown one form of mechanism which may be adopted, the same comprising a power-shaft 23, having thereon eccentrics 24, one for each side of the machine, each eccentric being connected by a link 25 to a guided rod 26, and the latter being connected by a link 27 to the end toggle of the series at that side of the machine. Hence a pull upon the link 27 will have a tendency to straighten the toggle to which it is connected, and thereby force inward the side of the hopper, this inward movement being accompanied by a longitudinal movement which will effect like straightening of the other toggles of the series, whereby the side of the hopper may be moved inward uniformly throughout its entire extent, a push upon the link 27 causing the bending of the toggles and a resulting outward movement of the side of the hopper.

The bottom of the hopper rests upon rollers 29, mounted in suitable bearings upon the base-beams 1, and the rear end of said bottom is suitably connected—as, for instance, by means of a pin, stud, or other connection 30—to a hauling rope or chain 31, which passes around a sheave 32 at the forward end of the machine and is connected to a winding-drum or windlass 33 at the rear of the machine, whereby upon turning said drum or windlass the bottom of the hopper, with the load of coal deposited thereupon, may be carried forwardly and projected into the oven. Part of one end of the oven is shown in Fig. 3. When the charge has been introduced into the oven, the door at the receiving end of the same can be closed down upon the removable bottom and the direction of motion of the drum or windlass 33 then reversed, so as to withdraw the bottom 6 of the hopper to its original position, leaving the charge of coal in the oven. If desired, the hauling rope or chain 31 may have such engagement with the supporting-rollers 29 as to impart positive rotating movement thereto, and thus cause them to act as propelling devices for the bottom of the hopper as well as supporting devices therefor, or other means of effecting the longitudinal movement of the bottom of the hopper may be adopted within the scope of our invention.

In the modification of our invention shown in Fig. 7, there are but two vertical girders 4 on each side of the machine, one of these girders being located adjacent to each end of the hopper, and the sides 5 of the hopper are trussed or braced, as shown, for instance, at 34, whereby they have such longitudinal rigidity that movement imparted to any portion of the side of the hopper will be transmitted throughout the same. In this case there is a toggle connection between the slides 7 and the sides of the hopper at one end only of the latter, the opposite end of each side of the hopper being pivoted directly to a slide 7, so that when power is imparted to the toggles by means of rods 35 to bend or straighten the same the sides of the hopper will swing upon their pivotal connections with the slides 7, the degree of expansion and contraction of the hopper in this case gradually increasing from the end at which the pivots are located to the opposite end of the same. This construction does not release the mass of coal contained in the hopper so effectively as the constructions shown in Figs. 3, 4, and 6. Hence the latter are preferred. Each row of vertical girders 4 carries at the top a longitudinal beam 36, and upon these beams are mounted the rails for the reception of the wheeled charging-truck 37, which, with its load of coal, is run into position over that portion of the hopper in which the charge is to be deposited, the coal being then permitted to flow into the hopper from the spouts 39. In order to provide for the compacting of the mass of coal in the hopper as it is deposited therein, we prefer to provide the charging-truck 37 with swinging arms 40, which can be locked in different positions of angular adjustment to segments 41 upon the truck, the outer ends of these arms carrying the cylinders 42 of fluid-actuated hammers, which may be of any ordinary construction, preferably of that type in which the length of stroke of the piston is immaterial, so that the stroke may gradually increase in length as the mass of coal is compacted beneath the blows of the hammer 43. In the starting operation the arms 40 may be adjusted in their lowermost position, and as the mass of coal accumulates in the hopper the arms may be raised, so as to maintain the hammers 43 always in proper operative position in respect to the top of the mass. When the hopper has received its complete and properly-compacted charge of coal, the sides of the hopper are slightly withdrawn laterally, so as to free the charge from the lateral pressure of said sides, and the bottom of the hopper then has longitudinal movement imparted to it, so as to carry the charge forward into the oven, the sides of the hopper being restored to their normal position after the bottom has been withdrawn again, the hopper being then in condition to receive a fresh charge of coal.

Of course it will be manifest that either the movable slides 7 or the toggle connections between the slides and the sides of the hopper may be employed for expanding and contracting said hopper; but we prefer to employ both sets of adjusting devices, the toggle mechanism being intended for the purpose of imparting quick movement to the sides in order to release the charge of coal from lateral pressure, and the slides being intended for moving the sides of the hopper from and toward each other in order to vary the width of the hopper to suit different widths of ovens in connection with which the charging device may be employed.

While we prefer to mount both sides of the hopper so as to permit of lateral movement of the same, only one side of the hopper may be thus mounted, if desired, the other side being fixed. Hence when in the claims we refer to the sides as being adjustable from and toward each other we intend such language to cover a construction in which either or both of the sides is movable laterally.

Having thus described our invention, we claim and desire to secure by Letters Patent—

1. In a coke-oven-charging machine, a hopper with sides adjustable from and toward each other, slides carrying an adjustable side of the hopper and laterally adjustable upon the frame of the machine, and means for effecting simultaneous adjustment of all of said slides, substantially as specified.

2. In a coke-oven-charging machine, a hopper with sides adjustable from and toward each other, laterally-adjustable slides carrying an adjustable side of the hopper, means for effecting simultaneous adjustment of all of said slides, and toggle mechanism interposed between the said slides and the side of the hopper and serving to effect lateral adjustment of the latter independent of the movement of the slides, substantially as specified.

3. In a coke-oven-charging machine, a hopper structure, a base-frame, a longitudinal row of vertical girders at each side of the same, a hopper for receiving the charge, and supporting devices for the sides of the hopper mounted upon said rows of vertical girders and adjustable laterally in respect thereto, substantially as specified.

4. In a coke-oven-charging machine, a hopper structure, a fixed frame, a hopper mounted thereon, and having sides adjustable from and toward each other, slides connected to an adjustable side of the hopper and mounted on the fixed frame so as to be adjustable laterally thereon, nuts on said slides, screw-stems adapted to bearings on the fixed frame and engaging said nuts, and means for operating said screw-stems, substantially as specified.

5. In a coke-oven-charging machine, a hopper structure, a fixed frame, a hopper having sides adjustable from and toward each other, slides connected to a movable side of the hopper and adjustable laterally on the fixed frame, nuts on said slides, screw-stems engaging said nuts and adapted to bearings on the fixed frame, sprocket-wheels on said screw-stems and an endless chain connected to said sprocket-wheels, substantially as specified.

6. In a coke-oven-charging machine, a fixed frame, a hopper thereon for receiving the charge, a fluid-operated hammer for compacting the charge in the hopper, a carrier for said hammer mounted on runways on the fixed frame, and means for adjusting the hammer-cylinder vertically in respect to said carrier, substantially as specified.

7. In a coke-oven-charging machine, a fixed frame, a hopper thereon for receiving the charge, a charging-truck mounted on runways on the fixed frame, a fluid-actuated hammer carried by said truck and adapted to compress the charge in the hopper, and means for adjusting the hammer-cylinder vertically in respect to the charging-truck, substantially as specified.

In testimony whereof we have signed our names to this specification in the presence of two subscribing witnesses.

SAMUEL T. WELLMAN.
CHARLES H. WELLMAN.
JOHN W. SEAVER.
THOMAS R. MORGAN.

Witnesses:
C. W. COMSTOCK,
W. A. JONES.